US008602193B2

(12) United States Patent
Clark (10) Patent No.: US 8,602,193 B2
(45) Date of Patent: Dec. 10, 2013

(54) BEARING ARRANGEMENT FOR HEAVY DUTY TRANSMISSION (75) Inventor: Andrew Clark, Vernon Hills, IL (US)

(73) Assignee: Twin Disc, Inc., Racine, WI (US)

( * ) Notice: Subject to any disclaimer, the term of this patent is extended or adjusted under 35 U.S.C. 154(b) by 876 days.

(21) Appl. No.: 12/605,962

(22) Filed: Oct. 26, 2009

(65) Prior Publication Data
US 2010/0040320 A1 Feb. 18, 2010

Related U.S. Application Data (63) Continuation-in-part of application No. 11/683,709, filed on Mar. 8, 2007.

(60) Provisional application No. 61/108,348, filed on Oct. 24, 2008.

(51) Int. Cl.
F16C 35/077 (2006.01)
F16H 57/02 (2012.01)

(52) U.S. Cl.
USPC ............ 192/110 B; 192/112; 74/606 R (58) Field of Classification Search
USPC ............ 192/110 B, 112; 384/571, 584, 557, 384/564, 569; 464/178; 403/28
See application file for complete search history.

(56) References Cited

U.S. PATENT DOCUMENTS

| 2,019,464 | A | | 3/1935 | Riblet |
| 2,729,981 | A | * | 1/1956 | Budzien ........................ 74/361 |
| 3,561,829 | A | | 2/1971 | Heldt |
| 4,217,766 | A | | 8/1980 | Suckow |
| 4,226,485 | A | | 10/1980 | Pruvot |
| 5,028,152 | A | | 7/1991 | Hill et al. |
| 5,366,299 | A | | 11/1994 | Hughes |
| 5,598,747 | A | | 2/1997 | Schetter |
| 6,273,614 | B1 | | 8/2001 | Nicot |
| 6,293,704 | B1 | | 9/2001 | Gradu |
| 7,175,350 | B2 | | 2/2007 | Gradu et al. |
| 7,318,759 | B2 | | 1/2008 | Bristol et al. |
| 7,837,587 | B2 | * | 11/2010 | Millar ........................... 475/198 |
| 2001/0046340 | A1 | | 11/2001 | Shimomura |
| 2002/0079179 | A1 | * | 6/2002 | Hirota et al. .................... 192/35 |
| 2005/0207689 | A1 | | 9/2005 | Gradu et al. |
| 2006/0018582 | A1 | | 1/2006 | Gradu et al. |
| 2007/0155578 | A1 | * | 7/2007 | Petruska et al. .............. 475/230 |
| 2007/0287339 | A1 | | 12/2007 | Bristol et al. |
| 2008/0219605 | A1 | | 9/2008 | Clark |
| 2009/0022440 | A1 | * | 1/2009 | Kueck et al. .................. 384/248 |
| 2009/0123271 | A1 | * | 5/2009 | Coffin et al. .................. 415/142 |
| 2010/0040320 | A1 | | 2/2010 | Clark |

* cited by examiner

Primary Examiner — David D Le
Assistant Examiner — Stacey Fluhart
(74) Attorney, Agent, or Firm — Boyle Fredrickson S.C.

(57) ABSTRACT

A bearing arrangement is provided that reduces effects of differences in rates of thermal expansion between transmission housings and shaft assemblies that are made from different materials. The bearing arrangement locates the bearings with respect to other components of a shaft assembly in a manner that establishes a bearing setting stack path along components that are made from materials having common coefficients of thermal expansion, despite the shaft assembly and bearing arrangements being mounted within a housing that is made from a material which has a dissimilar coefficient of thermal expansion.

19 Claims, 11 Drawing Sheets

BEARING ARRANGEMENT FOR HEAVY DUTY TRANSMISSION

CROSS-REFERENCE TO RELATED APPLICATIONS

This application seeks priority as a continuation-in-part from U.S. Non-Provisional patent application Ser. No. 11/683,709, filed on Mar. 8, 2007, and also seeks priority under 35 U.S.C. §119(e) to U.S. Provisional Patent Application Ser. No. 61/108,348, filed on Oct. 24, 2008, the entireties of which are expressly incorporated by reference herein in their entireties, as if fully set forth herein.

BACKGROUND OF THE INVENTION

1. Field of the Invention

The present invention relates generally to transmissions and more specifically to bearing arrangements of shaft assemblies within marine transmissions.

2. Discussion of the Related Art

It is a common practice to fabricate marine transmission housings out of aluminum castings to reduce the overall weight of a transmission. Notwithstanding, it is noted that components of transmission shaft assemblies such as, for example, clutch shaft assemblies and their respective bearing arrangements are typically made from steel. However, aluminum has a different coefficient of thermal expansion than steel, whereby components made from aluminum tend to expand to a greater extent than do components made from steel.

Accordingly, within a transmission, shaft assemblies and their bearing arrangements that are made from steel expand relatively less than the aluminum transmission housing components per unit of temperature increase. Such differing material characteristics can present problems when, for example, steel bearings of a bearing arrangement that support a steel shaft assembly are set or seated within opposing aluminum walls of an aluminum transmission housing. That is because when the transmission increases temperature, a distance between the opposing aluminum walls increases to a greater extent than does a length of the steel shaft assembly and distance between the bearings that support the shaft assembly, which are set within the aluminum walls.

Stated another way, a "setting" or clearance value, which is defined between the aluminum wall and respective bearing, increases with increases in temperature. Such additional clearance or increase in bearing setting allows the bearings and the shaft assembly components to axially float such that the shaft experiences a noticeable increase in end-play. This can lead to uneven bearing roller loading and uneven loading of gears that are driven by the shaft assembly, leading to premature wear of the bearings, gears, and/or other components within the transmission that require alignment with a centerline of the shaft.

Numerous attempts have been made to resolve such issues associated with discrepancies in coefficients of thermal expansion between housings and bearings. Most of these attempts include complex assemblies that have thrust washers and/or other components made from polymeric, elastomeric, or various exotic materials. However, components made from such materials can be expensive and wear out more quickly than other transmission components, leading to their own failure or failure of cooperating components.

SUMMARY OF THE INVENTION

The present invention provides a bearing arrangement to reduce the effects of differences in rates of thermal expansion between transmission housing components and shaft assembly or bearing components. This can be accomplished by providing a bearing arrangement that locates the bearings with respect to other components of a shaft assembly in a manner that establishes a bearing setting stack path along components that are made from materials having common coefficients of thermal expansion, despite the shaft assembly and bearing arrangement(s) being mounted within a housing that is made from a material which has a dissimilar coefficient of thermal expansion. Correspondingly, the components of the bearing setting stack path act in a unitary manner in response to changes in temperature, ensuring that bearings within the bearing arrangements do not cycle between being tightly set or loosely set. In this regard, the bearings maintain the shaft in a constant position with respect to the other components of the shaft assembly which maintains alignment and registration integrity of the rotating components within the transmission.

According to one aspect of the invention, a marine or other heavy duty transmission is provided that has a housing that is made from a first material having a first coefficient of thermal expansion and a clutch assembly provided within the housing. A rotating shaft is in driving communication with the clutch assembly and is made from a second material having a second coefficient of thermal expansion that is less that the first coefficient of thermal expansion. Accordingly, for a given increase in temperature, the housing undergoes a greater amount of thermal expansion than does the rotating shaft. A bearing arrangement supporting the rotating shaft within the housing includes an end bearing that is concentrically seated upon and axially fixed to an end of the rotating shaft. An intermediate bearing is coaxially aligned with the end bearing and concentrically spaced from the rotating shaft. A bearing retainer is provided that has a counterbore which concentrically houses at least part of the end bearing therein. The bearing retainer also has a lip that is sandwiched between the end and intermediate bearings.

In another aspect of this embodiment, the bearing arrangement includes a clutch bearing that is mounted axially spaced from the end and intermediate bearings and is concentrically seated upon and axially fixed to the rotating shaft. The bearing arrangement can also include a retainer nut that is attached to the rotating shaft and abuts the end bearing, preventing axial movement of the end bearing with respect to the rotating shaft in a first direction. Furthermore, a shoulder can be provided on the rotating shaft, with the shoulder abutting the clutch bearing so as to prevent axial movement of the clutch bearing with respect to the rotating shaft in a second, opposite direction. Shims can be provided within the bearing arrangement, for example between the clutch bearing and shoulder of the rotating shaft or between one of the end and intermediate bearings and the bearing retainer.

According to another aspect of this embodiment, a gear, for example a pinion gear, can be mounted concentrically outside of the rotating shaft and axially between the intermediate and clutch bearings, the gear driving various components within the clutch assembly. The gear can have a reduced diameter segment at an end thereof, and an inner race of the intermediate bearing is seated upon the reduced diameter segment of the gear.

According to yet anther preferred embodiment, the bearing retainer includes a cylindrical sidewall. A flange that extends radially outwardly from the cylindrical sidewall and a lip extends radially inwardly from the cylindrical sidewall. A pair of bearings abuts a pair of opposing surfaces of the lip of the bearing retainer.

In a further aspect of this embodiment, the bearing retainer has an annular land that is recessed into an end thereof, and a shim is seated against the annular land of the bearing retainer and therefore between the bearing retainer and, for example, the intermediate bearing.

According to yet another aspect of this embodiment, the flange of the bearing retainer is connected to the housing of the transmission. The flange can be mounted to an outer surface or other appropriate surface of the transmission housing.

In yet another aspect of this invention, the bearings of the pair of bearings have different outer diameters such that the pair of bearings includes a smaller diameter bearing and a larger diameter bearing. The bearing retainer can further include a counterbore that extends axially into the bearing retainer and the counterbore can house the smaller diameter bearing at least partially therein.

These, and other aspects and objects of the present invention will be better appreciated and understood when considered in conjunction with the following description and the accompanying drawings. It should be understood, however, that the following description, while indicating preferred embodiments of the present invention, is given by way of illustration and not of limitation. Many changes and modifications may be made within the scope of the present invention without departing from the spirit thereof, and the invention includes all such modifications.

BRIEF DESCRIPTION OF THE DRAWINGS

Preferred exemplary embodiments of the invention are illustrated in the accompanying drawings in which like reference numerals represent like parts throughout, and in which.

DETAILED DESCRIPTION OF THE PREFERRED EMBODIMENTS

Figure 1:
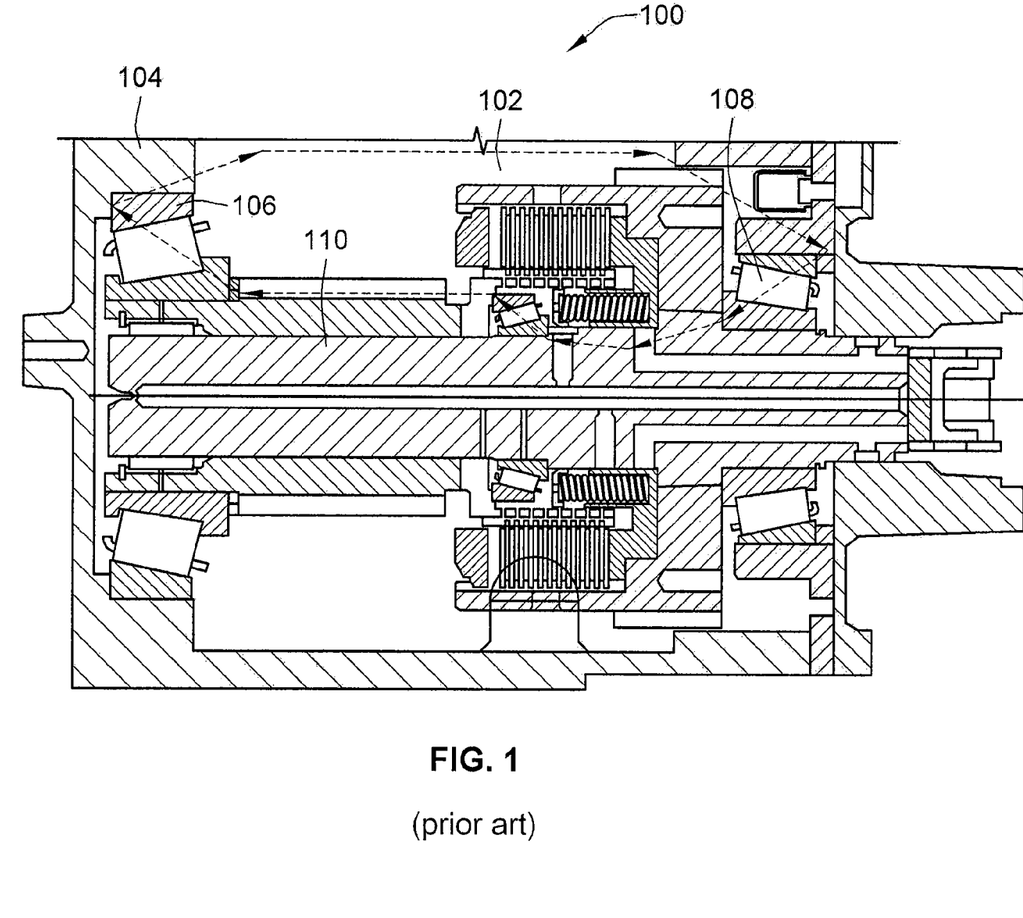
FIG. 1 is a cross-sectional view of a clutch shaft assembly of a prior art marine transmission.

With reference to the drawings, and particularly to FIG. 1, there is shown a cross-sectional view of a prior art clutch shaft assembly 102 of a marine transmission 100. Components of the clutch shaft assembly 102, for example, the clutch shaft 110, are made from steel while the transmission housing 104 is made from aluminum. A length of thermal expansion of the clutch shaft assembly 102 is defined as a change in a distance between the ends of the clutch shaft 110 due to a change in temperature. A length of thermal expansion in the transmission housing 104 is defined as a change in a distance between the end walls of transmission housing 104, against which the outer races of thrust bearings 106 and 108 are set, due to a change in temperature. Since aluminum has a greater coefficient of thermal expansion than steel, the length of thermal expansion of the transmission housing 104 is greater than the length of thermal expansion of the clutch shaft assembly 102.

Still referring to the prior art bearing arrangement of FIG. 1, a setting stack path is shown by the series of arrows that define a closed path. It is noted that the setting stack path illustrates that the bearing arrangement is axially restrained at its ends by the transmission housing 104. Since the aluminum transmission housing 104 has a greater length of thermal expansion than the clutch shaft assembly 102, increasing temperatures of the transmission 100 cause increasing setting of the thrust bearings 106 and 108, creating larger clearances between the thrust bearings 106, 108 and the transmission housing 104. This can lead to misalignment of components and/or damage to components in the transmission 100.

Figure 2:
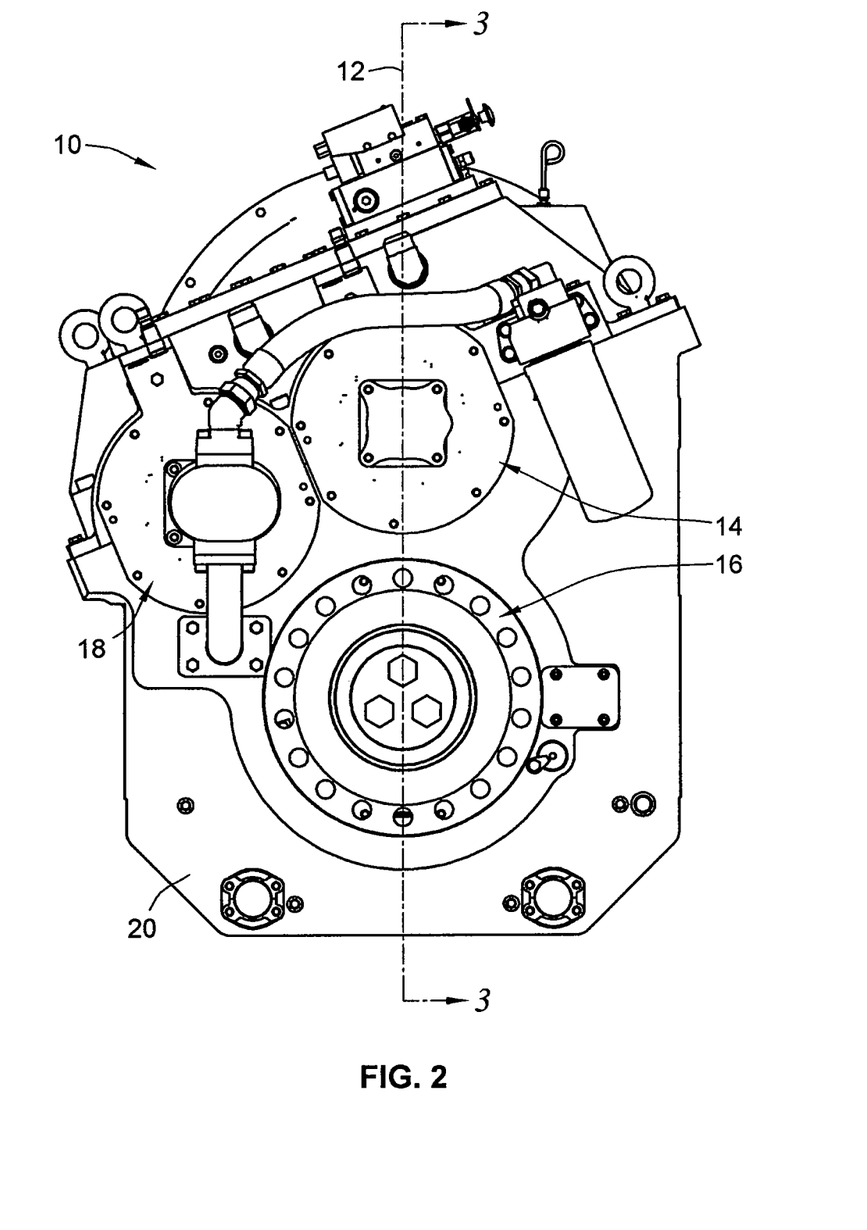
FIG. 2 is an end view of a marine transmission of a bearing arrangement in accordance with the present invention.

FIG. 2 shows an end view of a marine transmission 10 that includes an aluminum housing 20. A cutting plane line 12 is drawn through a centerline of a primary clutch shaft assembly 14 and an output shaft assembly 16. The marine transmission 10 also includes a secondary clutch shaft assembly 18 and a transmission housing 20. FIGS. 3-9 show various bearing arrangements 1 of the invention. The bearing arrangements 1 are used to locate rotating components within the transmission 10 and maintain their respective positions during use. This is done by purposefully designing the bearing setting stack, such bearing setting stack being the axially abutting components that, in combination, set the bearing and therefor locate or restrict axial movement thereof so that the entire bearing setting stack reacts, in a thermal expansion sense, as a unit, instead of different portions of the bearing setting stack reacting with different rates of thermal expansion to changes in temperature.

For example, the bearing arrangements 1 are provided in bearing setting stacks that are assembled from components which are made from materials having analogous coefficients of thermal expansion. This allows clearances between components of the stack to remain generally constant during use so that the stack does not unduly loosen or tighten when exposed to variations in temperature. Preferably, the bearing arrangements 1 are configured so that both ends of the bearing setting stack are axially anchored, directly or indirectly, to a common component such as a rotating shaft that defines a central axis of the shaft assembly.

Figure 3:
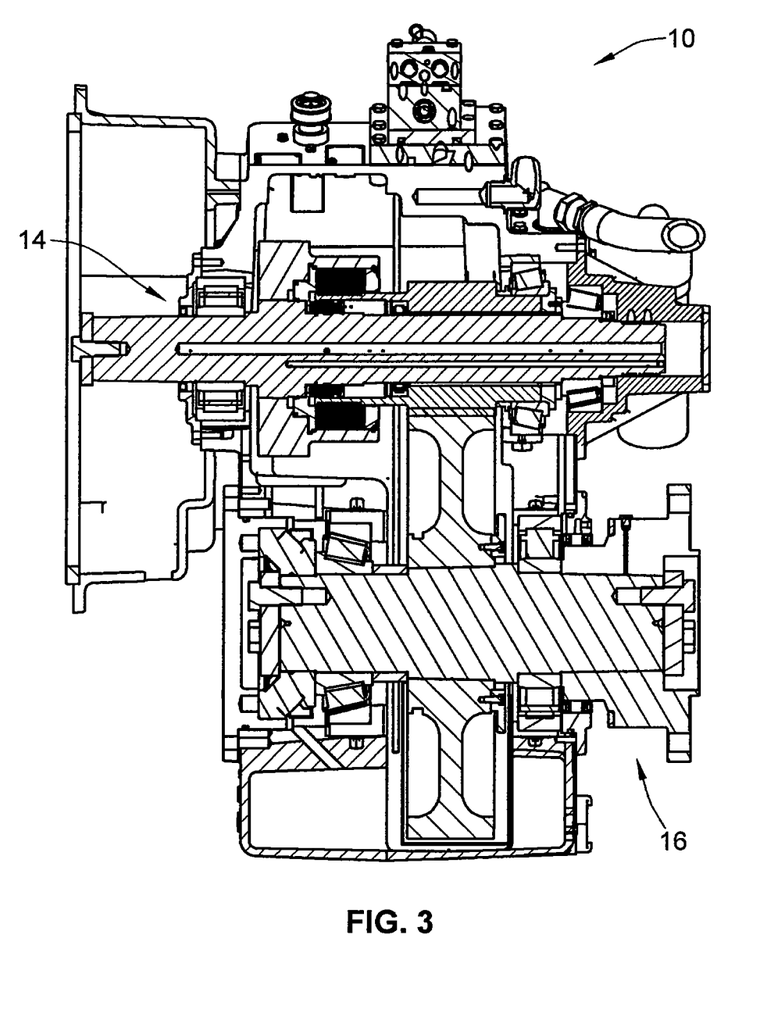
FIG. 3 is a cross-sectional view of a marine transmission of a bearing arrangement in accordance with the present invention.
Figure 4:
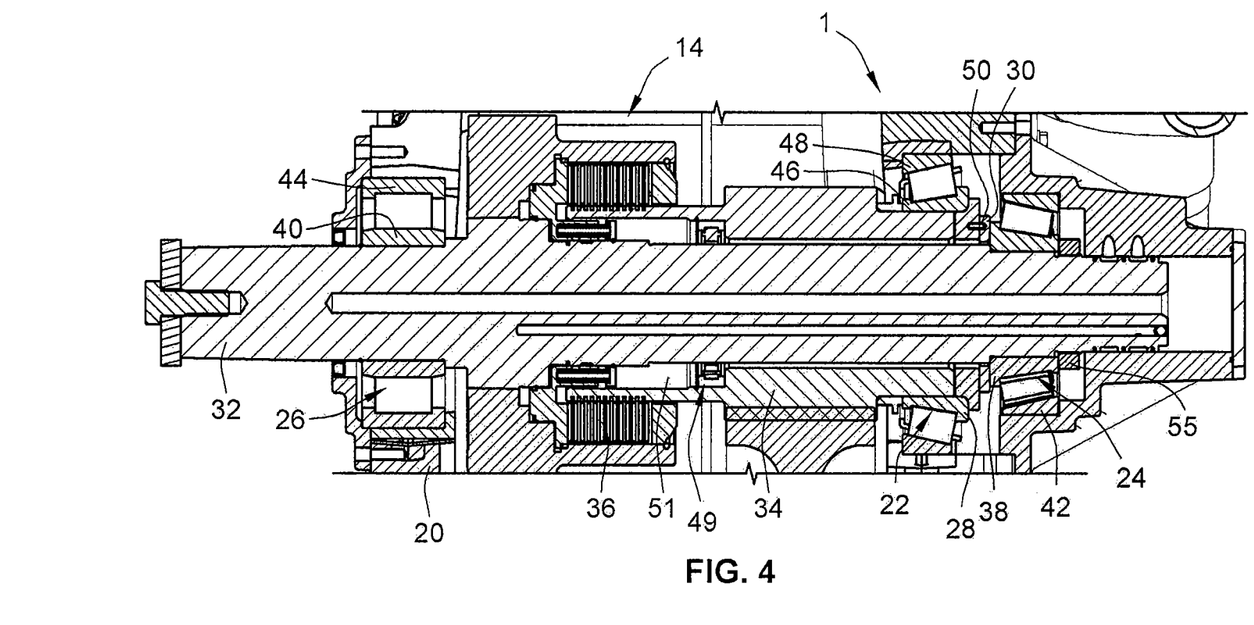
FIG. 4 is an enlarged cross-sectional view of a clutch shaft assembly of a marine transmission having a bearing arrangement in accordance with the present invention.

Referring now to FIGS. 3-4, a bearing arrangement 1 includes a pinion gear thrust (or intermediate) bearing 22, a pinion gear roller bearing 49, a clutch shaft thrust (or end) bearing 24, a shaft roller bearing 26 and a thrust washer 30. A primary clutch shaft assembly 14 is rotatably supported by the bearing arrangement 1 and includes a clutch shaft 32, a pinion gear 34, a retainer nut 55, a pinion retainer 28, and a clutch assembly 36. An inner race 38 of the clutch shaft thrust (end) bearing 24 is retained on one end of the clutch shaft 32 and the other end by retainer nut 55 and an inner race 40 of the shaft roller bearing 26 is retained on the other end of the clutch shaft 32. An outer race 42 of the clutch shaft thrust (end) bearing 24 is retained at one end by an end cap or collector near a first end of the transmission housing 20 and an outer race 44 of the shaft roller bearing 26 is retained in the other end of the transmission housing 20. The pinion gear 34 rotates in either direction relative to the clutch shaft 32, depending on clutch engagement. An inner race 46 of the pinion gear thrust (intermediate) bearing 22 is retained on one end of the pinion gear 34 with a pinion bearing retainer 28. An outer race 48 of the pinion gear thrust (intermediate) bearing 22 is retained in the transmission housing 20. The pinion bearing retainer 28 is preferably attached to the one end of the pinion gear 34 with fasteners (not shown) or the like. A pinion gear roller bearing (or clutch) bearing 49 is retained in a pinion bore 51 disposed in substantially the other end of the pinion gear 34, such that the pinion gear 34 rotates relative to the clutch shaft 32.

The thrust washer 30 is retained on the pinion bearing retainer 28 with at least two dowels 50 or the like. The inner race 38 of the clutch shaft thrust (end) bearing 24 physically contacts the thrust washer 30 and frequently rotates in a direction opposite thereto. The thrust washer 30 is fabricated from a special material that is resistant to wear, due to frictional contact from the inner race 38 of the clutch shaft thrust (end) bearing 24. The special material was not available until recently. The special material must have a pressure-velocity value of at least 1,000,000 psi-ft/min. A suitable special material is sold under the trade name of Vespel SP-21. Vespel SP-21 is manufactured by DuPont, Inc. However, the special material should not be limited to Vespel SP-21, but should include any material that has pressure-velocity characteristics of at least 1,000,000 psi-ft/min. Thrust washers fabricated from even the hardest materials in the past would wear out in a short period of time and fail. The thrust washer 30 (fabricated from the special material) allows close placement of the thrust (intermediate and end) bearings 22, 24. The length of thermal expansion is limited to the distance from the opposite ends of the two thrust (intermediate and end) bearings 22, 24.

Figure 5:
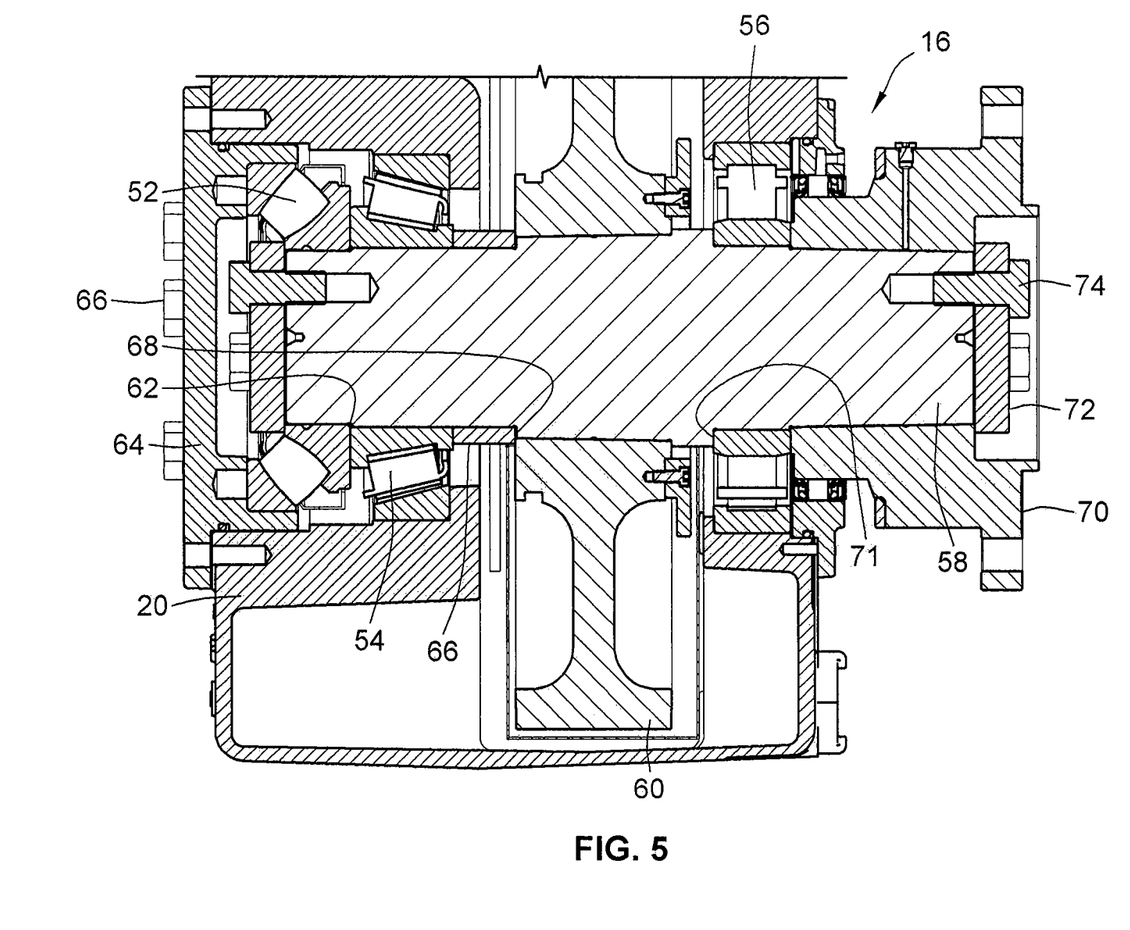
FIG. 5 is an enlarged cross-sectional view of an output shaft assembly of a marine transmission having a bearing arrangement in accordance with the present invention.

With reference to FIG. 5, the output shaft assembly 16 includes an output shaft 58 and an output gear 60. The output gear 60 is driven by the pinion gear 34. Inner races of a first thrust bearing 52 and a second thrust bearing 54 rotate in the same direction and thus are placed in contact with each other without inducing wear. The first thrust bearing 52 is retained between a second thrust bearing 54 and a bearing retaining cap 64. The bearing retaining cap 64 is attached to the transmission housing 20 with a plurality of fasteners 66.

The second thrust bearing 54 is retained between the first thrust bearing 52, a tubular spacer 66, and a second step 68 in the output shaft 58. A shaft roller bearing 56 is retained between a third step 71 in the output shaft 58 and an output flange 70. The output flange 70 is secured to an end of the output shaft 58 with an end plate 72 and at least two fasteners 74. The length of thermal expansion is limited to the distance from the opposite ends of the first and second thrust bearings.

Referring now to FIGS. 6-9, in some embodiments, no thrust washer 30 is implemented within the bearing arrangement 1. Such embodiments also incorporate a tapered roller bearing as (clutch) bearing 49, in lieu of the cylindrical roller (clutch) bearing 49 seen in FIG. 4. The embodiments of FIGS. 6-9 include bearing arrangements 1 that are integrated into a bearing setting stack that is axially anchored on each end, directly or indirectly, to the clutch shaft 32. As seen best in FIG. 7, a bearings setting stack path is represented by a closed loop series of arrows that pass through the components of the bearing setting stack, between the two ends of the bearing arrangement 1.

Figure 6:
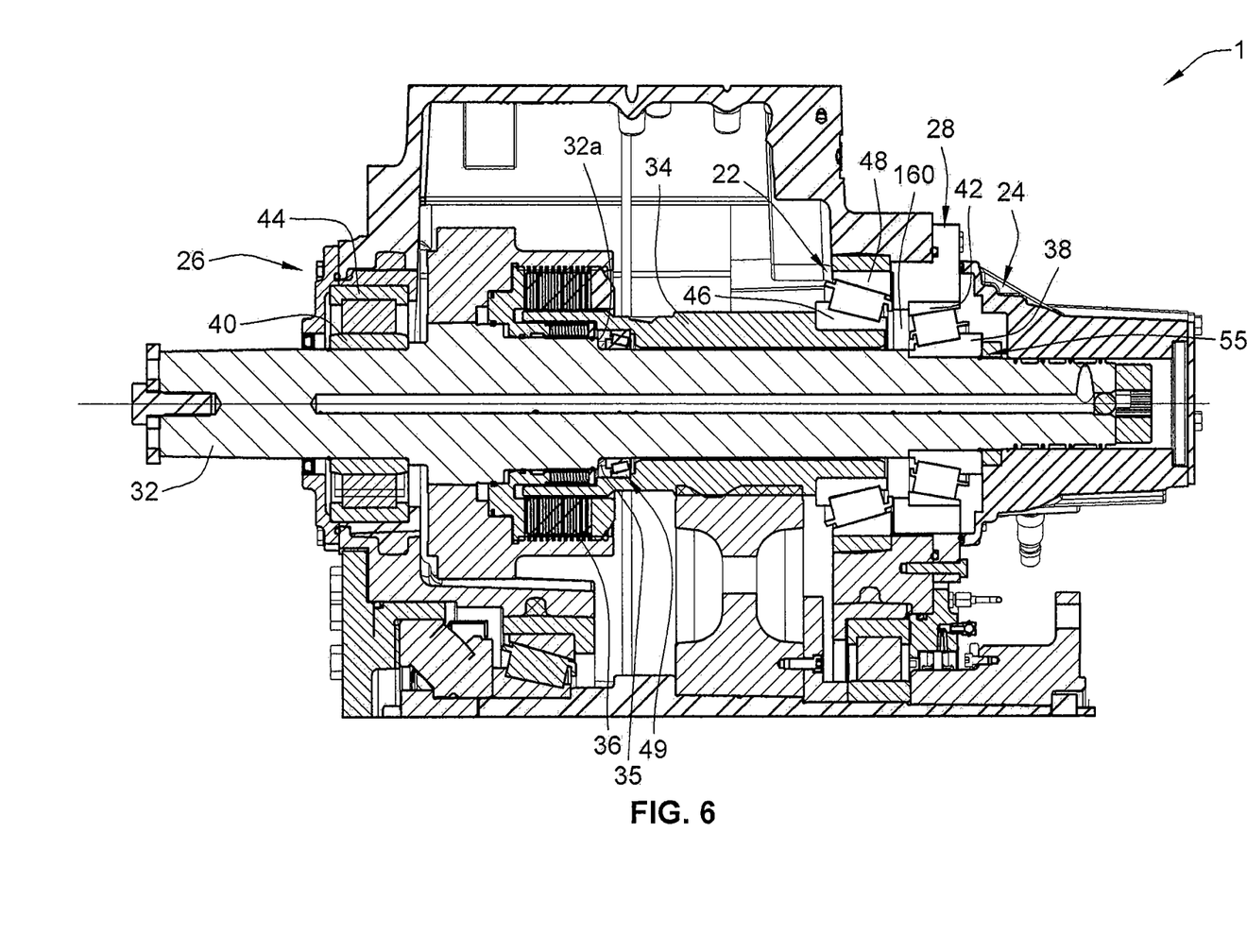
FIG. 6 is a cross-sectional view of a marine transmission incorporating a first variant of the bearing arrangement of FIG. 3.
Figure 7:
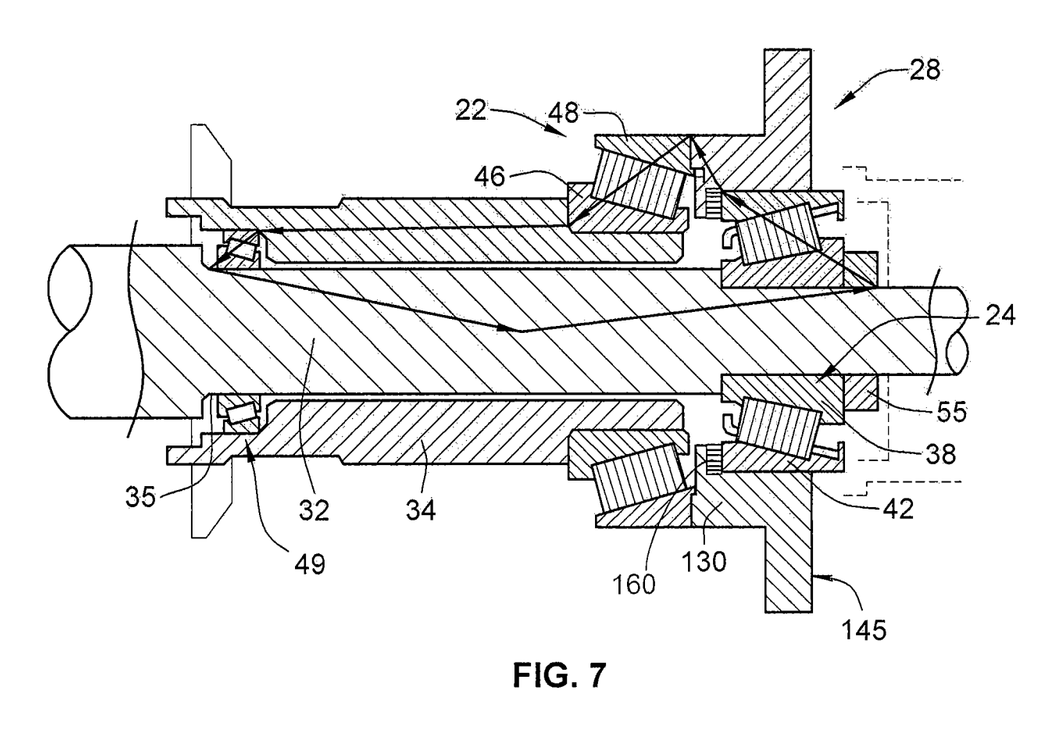
FIG. 7 is a cross-sectional view of a marine transmission and bearing arrangement of FIG. 6, showing a bearing setting stack path.

Referring specifically to FIGS. 6 and 7, as compared to the arrangement seen in FIG. 4, each of bearings 22 and 24 is flipped so that the respective tapering portions face the other way. Accordingly, the rollers of bearing 22 slant conically inward to the right as illustrated, or toward bearing 24. The rollers of bearing 24 slant conically inward to the left as illustrated, or toward bearing 22. The rollers of bearing 49 slant conically inward to the right as illustrated, or toward the bearing 22. Bearing 49 is sandwiched and axially restrained between the pinion gear 34 on one side and a shim 35 on the other which abuts a shoulder 32A on the clutch shaft 32.

Still referring to FIGS. 6 and 7, in this configuration, all of the bearings 22, 24, and 49 are contained within or axially abut or set against ferrous components, whereby effects of a greater rate of thermal expansion of the aluminum housing when compared to a rate of thermal expansion of the bearings and components of the clutch shaft assembly 14 are mitigated. Stated another way, along the length of the clutch shaft 32, the bearings 22, 24, and 49 are longitudinally confined or restrained by ferrous components which are preferably all connected to or anchored by the clutch shaft 32 itself. The ferrous components can include various ones of, for example, (i) bearing retainer 28, (ii) an endcap that encapsulates the end-most portion of the clutch shaft assembly 14, (iii) shoulders, ledges, lips, projections, counterbores, or other suitable mechanical interfacing-type structures in the bearing retainer 28 and endcap, shoulders, ledges, lips, projections, upon the bearing retainer 28 and endcap, (iv) shoulders, ledges, lips, projections, counterbores, or other suitable mechanical interfacing-type structures in the bearing retainer 28 and endcap, shoulders, ledges, lips, projections on the clutch shaft 32, pinion gear 34, and/or other ferrous structures that are suitably close to the clutch shaft assembly 14 to serve as bearing support-type structures.

Referring now to FIGS. 6-7 and 10-12, bearing retainer 28 is preferably implemented as part of the bearings setting stack and serves as a transitioning medium between the bearing arrangement 1 and clutch shaft assembly 14, and the aluminum housing 20 of transmission 10. Bearing retainer 28 has a body with a cylindrical sidewall 130 and defines a back side 132 that faces away from the clutch assembly 36 and a front side 134 that faces toward the clutch assembly 36. A counterbore 140 extends into the back side 132 of the body of the bearing retainer 28.

Still referring to FIGS. 6-7 and 10-12, a flange 145 extends radially out from an outer surface of the sidewall 130, on the other side of the sidewall 130 from the counterbore 140. A groove 148 extends into a forward facing surface of the flange 145, extending entirely about but is radially spaced from the sidewall 130 and is configured to hold an O-ring or other seal that sits between the bearing retainer 28 and the aluminum housing 20.

In some embodiments, the flange 145 is configured to cooperate with the other portions of the bearing retainer 28 in a manner that allows the bearing retainer 28 to accommodate the differences between the thermal expansion rates of the aluminum transmission housing 20 and the various ferrous components of the clutch shaft assembly 14. For example, a diameter of flange 145 and the radial distance that the flange 145 extends from sidewall 130 is selected along with a thickness dimension of the flange 145 to provide a desired amount of flexibility or delectability with respect to the remainder of the bearing retainer 28.

In such configuration, while the remainder of body of bearing retainer 28 is anchored between, for example, the bearings 22 and 24, the flange 145 can bend away from the clutch assembly 36 when it is being pushed by the aluminum housing 20, to which it is mounted, when the aluminum housing 20 undergoes a greater amount of thermal expansion than does the components of the bearing arrangement 1 or bearing setting stack. The flexibility of flange 145 therefor absorbs and accommodates such difference in thermal expansion rates in a manner that the greater amount of thermal expansion of the aluminum housing 20 is not translated to the bearing setting stack, whereby the bearing settings are not increased and the bearing setting stack is not loosened.

Referring yet further to FIGS. 6-7 and 10-12, a lip 150 extends radially inward from an inner surface of the sidewall 130 of bearing retainer 28. The lip 150 is axially spaced from the front side 134 of the body of the bearing retainer 28 such that a first annular land 155 is defined by the forward facing surface of the lip 150. A second annular land 158 is defined on an opposing side of the lip 150; in other words, facing toward the back side 132 of the body of bearing retainer 28.

As seen in FIG. 7, a shim 160 can be seated against the first annular land 158. Shim 160 fits between respective portions of the bearing retainer 28 and bearing 24, while noting that the outer surface of front side 155 abuts a side surface of outer race 48. Also seen in FIG. 7, the bearing 24 is seated against the second annular land 158 of lip 150, namely, a side surface of the outer race 42 abuts the second annular land 158, whereby the lip 150 of bearing retainer 28 is incorporated into the bearing setting stack.

Still referring to FIG. 7, the bearing setting stack is defined by the components that axially abut each other and correspondingly locate the bearings of the bearing assembly 1. Such components of the bearing setting stack include, (i) bearing 49 and its respective rollers and raceways and, optionally, its shims 35, (ii) clutch shaft 32, (iii) a retainer nut 55, (iv) bearing 24 and its respective rollers and raceways 38, 42, (v) lip 150 and/or other portions of bearing retainer 28 and, optionally, its shims 160, (vi) bearing 22 and its respective rollers and raceways 48, 46, and (vii) pinion gear 34. Once again, in preferred embodiments, all or substantially all of these components within the bearing setting stack are made from a ferrous material, most preferably steel.

Figure 8:
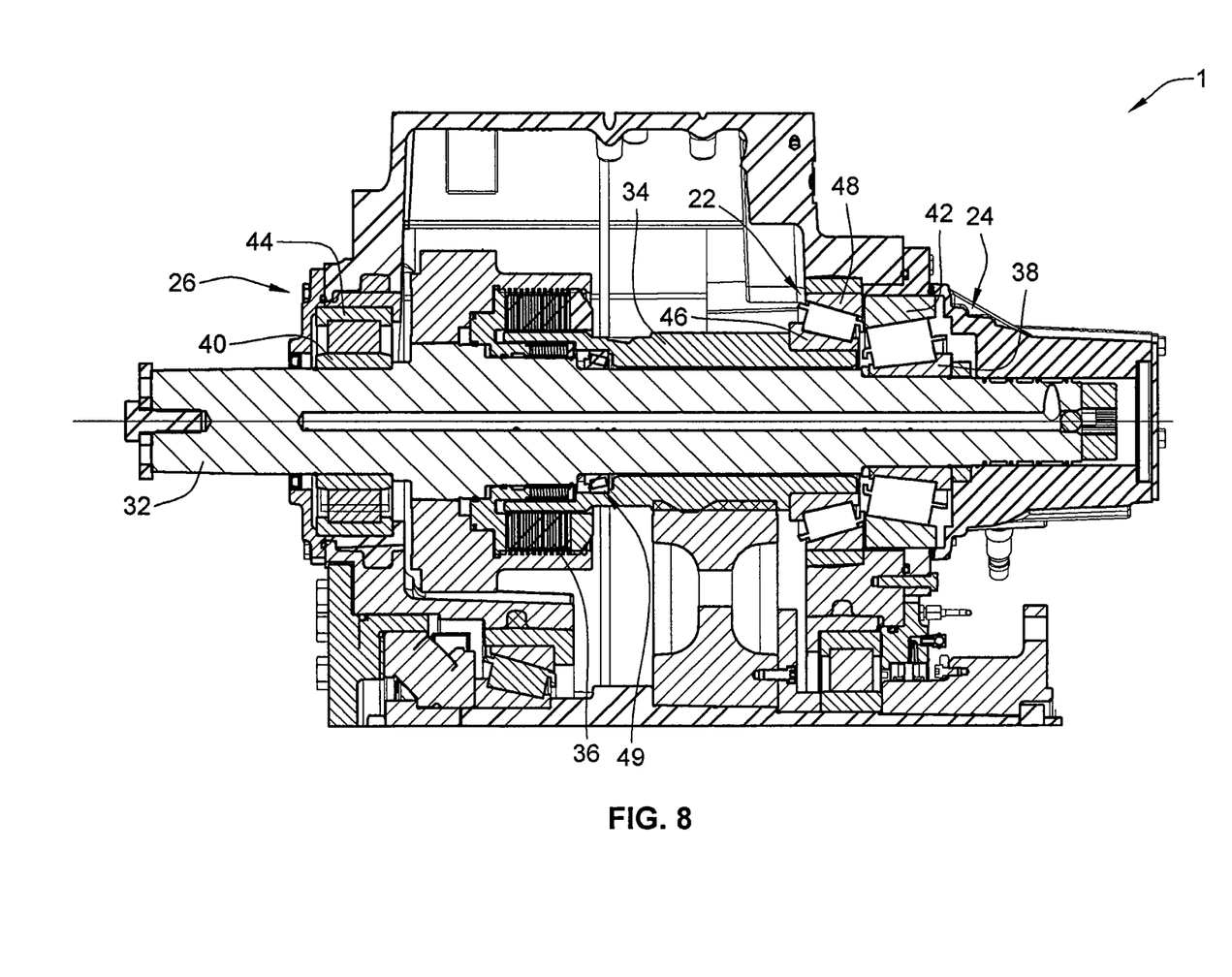
FIG. 8 is a cross-sectional view of a marine transmission incorporating a second variant of the bearing arrangement of FIG. 3.
Figure 9:
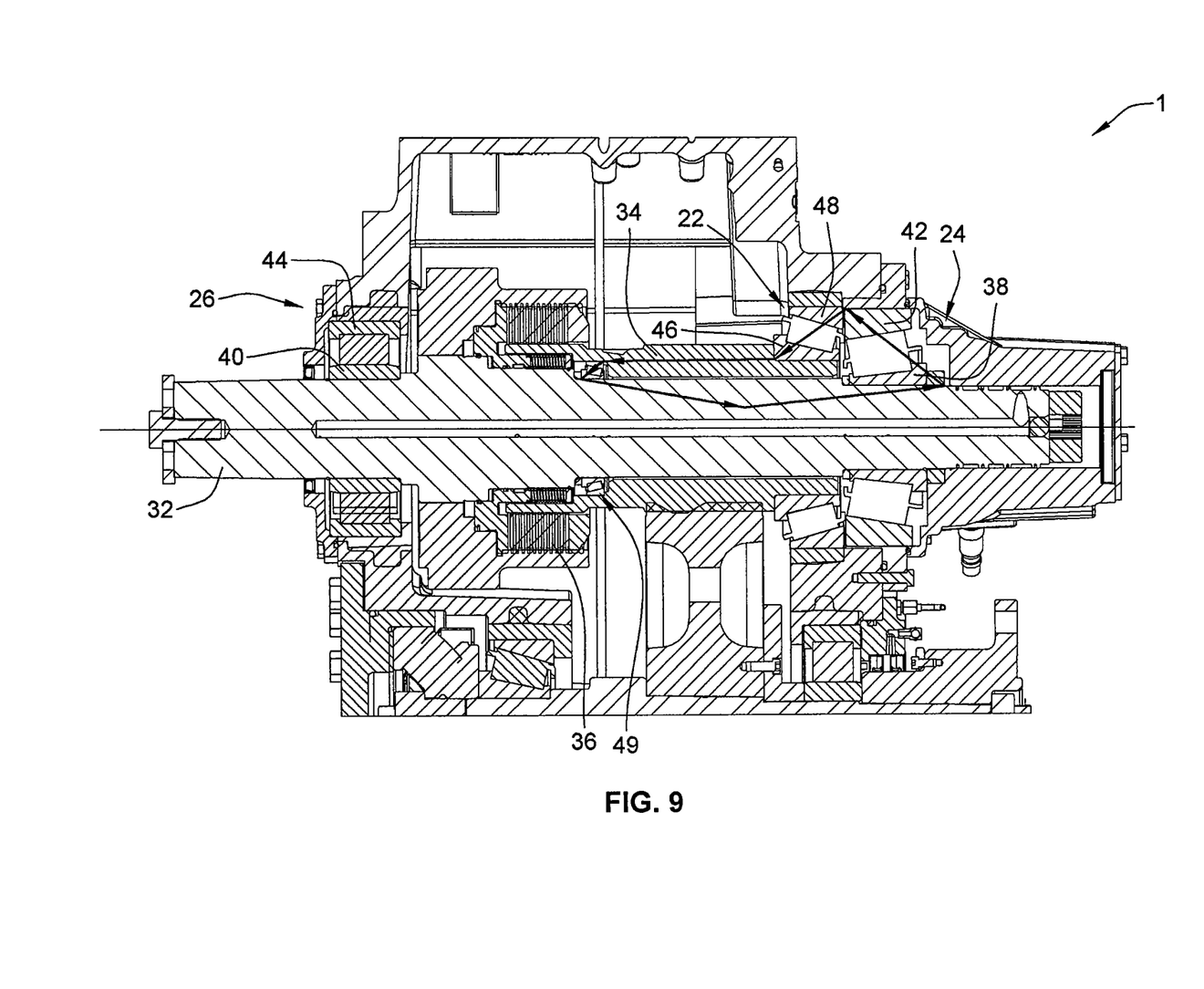
FIG. 9 is a cross-sectional view of a marine transmission and bearing arrangement of FIG. 8, showing a bearing setting stack path.
Figure 10:
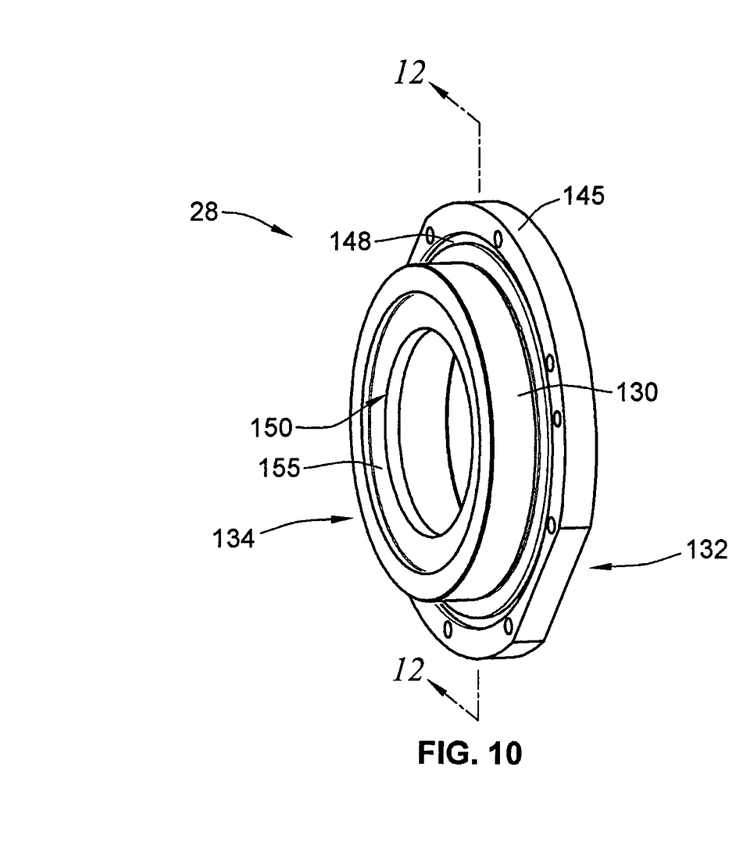
FIG. 10 is a pictorial view of the bearing retainer of FIG. 6.
Figure 11:
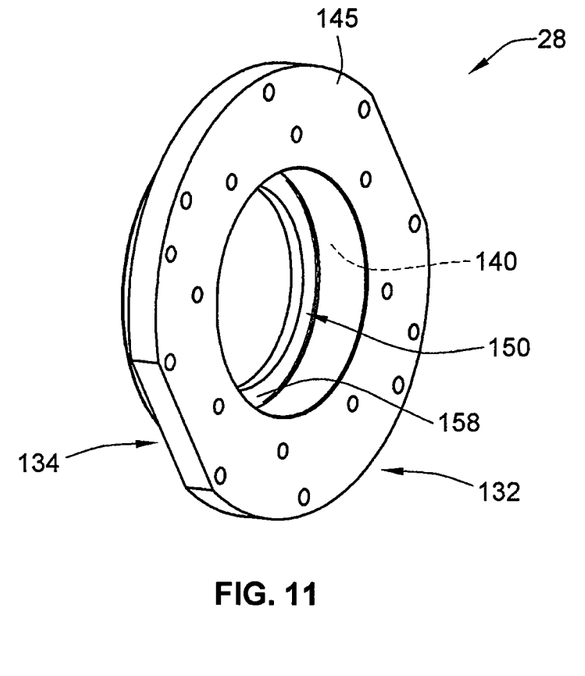
FIG. 11 is another pictorial view of the bearing retainer of FIG. 6.
Figure 12:
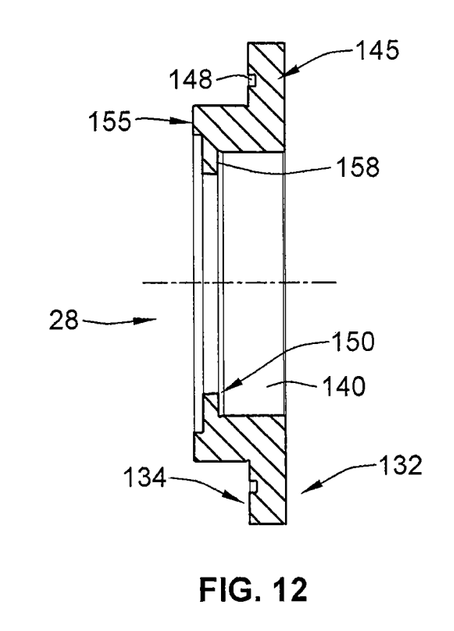
FIG. 12 is a cross-sectional view of the bearing retainer of FIG. 10, taken through line 12-12.

Referring now to FIGS. 8 and 9, some alternative embodiments are contemplated in which no bearing retainer 28 is utilized in the bearing arrangement 1, but instead the bearings 22 and 24 directly abut each other or optionally abut each other with a shim therebetween. FIG. 8 shows the bearings 22 and 24 with their rollers tapering inwardly towards each other, similar to the arrangement seen in FIG. 4. FIG. 9 shows the bearings 22 and 24 with their rollers tapering the opposite direction, that is, inwardly toward each other.

Referring now specifically to FIG. 9, another bearing setting stack path is shown, having bearings 22 and 24 in an adjacent face to face relationship with each other without an intervening lip of bearing retainer 28. Accordingly the bearing setting stack path seen in FIG. 9 is largely analogous to that in FIG. 7, only being devoid of the lip 150 of bearing retainer 28.

The bearing arrangement 1 need not be limited to clutch shafts for marine transmissions, but can include any shaft application with an object that rotates on the shaft in a direction opposite of the shaft. The object could be a gear, a clutch, a clutch assembly or any other device. Regardless, it is noted that many changes and modifications may be made to the present invention without departing from the spirit thereof. The scope of some of these changes is discussed above. The scope of others will become apparent from the appended claims.

What is claimed is:

1. A heavy duty transmission, comprising:
   a housing made from a first material having a first coefficient of thermal expansion;
   a clutch assembly provided within the housing;
   a rotating shaft in driving communication with the clutch assembly and being made from a second material having a second coefficient of thermal expansion that is less than the first coefficient of thermal expansion such that for a given increase in temperature, the housing undergoes a greater amount of thermal expansion than does the rotating shaft;
   a bearing arrangement supporting the rotating shaft within the housing and including,
      an end bearing being concentrically seated upon and axially fixed to an end of the rotating shaft;
      an intermediate bearing being coaxially aligned with the end bearing and concentrically spaced from the rotating shaft; and
      a bearing retainer including a cylindrical sidewall that has a counterbore which concentrically houses at least part of the end bearing therein, and a lip extending inwardly from the cylindrical sidewall and that is sandwiched between the end and intermediate bearings and a flange extending outwardly from the cylindrical sidewall, the bearing retainer arranged so that each of the cylindrical sidewall and the flange engages the housing, wherein the retainer is separate from the housing and fixed thereto at the flange.

2. The heavy duty transmission of claim 1, the bearing arrangement further comprising a clutch bearing that is mounted axially spaced from the end and intermediate bearings and concentrically seated upon and axially fixed to the rotating shaft.

3. The heavy duty transmission of claim 2, the bearing arrangement further comprising a retainer nut that is attached to the rotating shaft and abuts the end bearing so as to prevent axial movement of the end bearing with respect to the rotating shaft in a first direction.

4. The heavy duty transmission of claim 3, the rotating shaft further comprising a shoulder that abuts the clutch bearing so as to prevent axial movement of the clutch bearing with respect to the rotating shaft in a second, opposite direction.

5. The heavy duty transmission of claim 4, the bearing arrangement further comprising at least one shim that is sandwiched between the clutch bearing and the shoulder of the rotating shaft.

6. The heavy duty transmission of claim 4, further comprising a gear that is mounted concentrically outside of the rotating shaft between the intermediate and clutch bearings.

7. The heavy duty transmission of claim 6, the gear further comprising a reduced diameter segment at an end thereof, and wherein an inner race of the intermediate bearing is seated upon the reduced diameter segment of the gear.

8. A heavy duty transmission, comprising:
   a housing made from a first material having a first coefficient of thermal expansion;
   a rotating shaft in driving communication with a clutch assembly and being made from a second material having a second coefficient of thermal expansion that is less than the first coefficient of thermal expansion such that for a given increase in temperature, the housing undergoes a greater amount of thermal expansion than does the rotating shaft;
   a bearing retainer mounted concentrically outside of the rotating shaft, the bearing retainer including,
      a cylindrical sidewall;
      a flange extending radially outwardly from the cylindrical sidewall; and
      a lip extending radially inwardly from the cylindrical sidewall; and a pair of bearings abutting a pair of opposing surfaces of the lip of the bearing retainer;

wherein the bearing retainer is arranged so that each of the cylindrical sidewall and the flange engages the housing, and wherein the retainer is separate from the housing and fixed thereto at the flange.

9. The heavy duty transmission of claim 8, further comprising at least one shim that is sandwiched between at least one bearing of the pair of bearings and the lip of the bearing retainer.

10. The heavy duty transmission of claim 9, the bearing retainer further comprising an annular land that is recessed into an end thereof, the at least one shim being seated against the annular land of the bearing retainer.

11. The heavy duty transmission of claim 8, wherein the flange of the bearing retainer is connected to the housing of the transmission.

12. The heavy duty transmission of claim 11, wherein the flange of the bearing retainer is mounted to an outer surface of the housing of the transmission.

13. The heavy duty transmission of claim 8, the bearing retainer further comprising a counterbore that extends axially into the bearing retainer.

14. The heavy duty transmission of claim 13, wherein a smaller diameter bearing is seated in the counterbore of the bearing retainer.

15. The heavy duty transmission of claim 8, wherein the pair of bearings have different outer diameters such that the pair of bearings includes a smaller diameter bearing and a larger diameter bearing.

16. The heavy duty transmission of claim 15, further comprising a gear that is mounted concentrically outside of and rotatable with respect to the rotating shaft.

17. The heavy duty transmission of claim 16, wherein an inner race of the larger diameter bearing is seated upon an outer surface of the gear.

18. The heavy duty transmission of claim 17, further comprising a clutch bearing that is mounted radially between the gear and the rotating shaft.

19. The heavy duty transmission of claim 18, further comprising a retainer nut that is connected to the rotating shaft and restricting axial movement of the smaller diameter bearing in a first direction; and a shoulder defined in an outer surface of the rotating shaft and restricting axial movement of the clutch bearing in a second, opposite direction.

* * * * *

UNITED STATES PATENT AND TRADEMARK OFFICE
CERTIFICATE OF CORRECTION

| | | |
|---|---|---|
| PATENT NO. | : 8,602,193 B2 | Page 1 of 1 |
| APPLICATION NO. | : 12/605962 | |
| DATED | : December 10, 2013 | |
| INVENTOR(S) | : Clark | |

It is certified that error appears in the above-identified patent and that said Letters Patent is hereby corrected as shown below:

On the Title Page, item (54) and in the Specification, Col. 1 the title of the Patent should be "Bearing Arrangement for Heavy Duty Marine Transmission."

Signed and Sealed this
Twenty-third Day of September, 2014

Michelle K. Lee
*Deputy Director of the United States Patent and Trademark Office*